United States Patent Office 3,113,015
Patented Dec. 3, 1963

3,113,015
PROCESS FOR THE PRODUCTION OF DENSELY ADHERING LAYERS OF A POWDER AGENT ON THE SURFACE OF GRANULATED AND CRYSTALLIZED FERTILIZERS
Fritz W. Brandt and Alfred Dolde, Refrath, near Cologne, Germany, assignors to Chemische Fabrik Kalk G.m.b.H., Cologne-Kalk, Germany, a German corporation
No Drawing. Filed Nov. 30, 1959, Ser. No. 855,966
15 Claims. (Cl. 71—64)

The present invention relates to the production of densely adhering layers of power agents on the surface of granulated and crystallized fertilizers and more particularly to a process for producing such layers using hygroscopic salts in addition to said powder agents whereby improved adhesive strength of the powder agents is obtained.

As is known, the individual profiled particles of synthetic fertilizers tend during storage to more or less stick together, depending upon the surrounding conditions of humidity. This objectionable sticking together may be prevented by enveloping the fertilizer particles or grains with a layer or covering of inert powder materials, such as, for example, kieselguhr.

The qualities of adhesiveness of such powder materials as is well known, become less effective with increasing particle magnitude of the powder material. Although extremely finely divided powder materials may adhere solidly and in large amount to the surface of the fertilizer grains, nevertheless they are hardly ever used for the powdering of fertilizers since they are too expensive for general commercial use. In industrial practice, mostly coarser powder materials of low degrees of fineness, which of course also possess less adhesive strength, are used for the powdering of fertilizers. In this connection, processes have already been described for the powdering of fertililzers which are claimed to effect improvements in the adhesive strength of such powder materials with respect to the fertilizer materials.

Thus, according to French Patent 1,016,367, the inert powder substances are pretreated with hydrophobic substances, such, as, for example, paraffin, stearin or organic silicon compounds before their application. These substances have a double effect, i.e., they increase the adhesive strength of the powder material, and also render the powdered granules water-repellent. Although the last named characteristic is desirable during storage of the fertilizers, it causes considerable delay in the dissolution and hence the effectiveness of the particular fertilizers placed in the soil.

Moreover, it has already been suggested to mix powder agents with an aqueous solution of a polyvalent alcohol, a polyalcohol or a water-soluble cellulose and/or lignin derivative and to use this mixture for the powdering of fertilizers.

Another method for improving the adhesive strength of of powder materials is described in German Patent No. 1,-007,788. According to this method, crystalline or granulated fertilizers are first powdered with an inert powder material or with a mixture of such materials, and subsequently treated with vapor phase anhydrous acids or anhydrous compounds in vapor phase, which may be decomposed by hydrolysis. Any remaining acidity of the powder layer may be neutralized through the addition of vapor phase basic materials. By means of this mode of operation reaction products in finest distribution are produced in the powder and at the fertilizer surface which effect a cross-linking of the powder with the fertilizer grains.

Among the particular advantages of this process are the facts that in the powdering step a remoistening of the already dried fertilizers is avoided and that through a suitable selection of the substances to be used a part of the water of adsorption still present after the drying of the fertilizer may be either bound through chemical conversion or removed as water of hydration.

Any hygroscopic materials which may occur during the reaction for the formation of the cross-linked powder layer according to the aforementioned mode of operation are converted into non-hygroscopic compounds by means of further conversion steps inasmuch as the hygroscopicity of these materials is considered to cause so much water to pass into contact with the individual fertilizer grains that after a while the grains decompose in storage and eventually deliquesce. Hence, the presence of hygroscopic materials in the powder layer enveloping the fertilizer grains has always been considered to unfavorably influence the storability of such fertilizers since they serve to produce water retention and deliquescence of the so powdered fertilizer grains.

It is an object of the present invention to overcome the foregoing drawbacks and to provide a process for the production of densely adhering layers of powder agents on the surface of granulated and crystallized fertilizer materials without the occurrence of sticking of the granular fertilizer upon storage by using hygroscopic salts in addition to the powder agents in dusting the fertilizer materials.

It is a further object to incorporate such hygroscopic salts into said powder agents on the surface of the granular fertilizer materials in the presence of just enough water to yield a most concentrated salt solution on the fertilizer grains.

Other and further objects of the invention will become apparent from a study of the within specification and accompanying examples.

In accordance with the present invention, it has been found that densely and strongly adhering layers of powder agents on the surface of granular fertilizers may be prepared by incorporating a hygroscopic salt into such a powder agent on the surface of the granular fertilizer material in the presence of water. In view of the hitherto known adverse effect of hygroscopic materials on fertilizer materials with regard to the sticking together of the same upon storage, it is suprising that the very hygroscopic characteristics of certain hygroscopic materials may be effectively utilized for improving the adhesive strength of the powder agents on the surface of granulated or crystallized fertilizer materials.

As powder agents which may be used in accordance with the invention are any inert powder materials, preferably possessing adsorptive properties, such as kieselguhr, fuller's earth, flue dust or quick ash, and ground slate, either alone or in mixture.

To such a powder agent a hygroscopic salt or a mixture of such salts is added in the presence of water. The hygroscopic salt is incorporated into the powder agent either prior to, simultaneously with or subsequently to the conversion of the salt into a concentrated solution with the addition of just the corresponding amount of water required to effect solution in concentrated form. The water is preferably added in vapor phase.

Furthermore, the salt may be supplemented by the addition of a small amount of a non-ionic surface-active compound either before, during or after its incorporation, as for example, by dusting onto the surface of the granular fertilizer material.

Among such non-ionic active surface compounds which may be used in this respect are polyhydric alcohol esters of high molecular mineral organic acids such as those sold under the name of Advawet NA–6 produced by Advance Solvents and Chemical Corp. and further non-ionic surface active compounds such as those produced by Alrose Chemical Company including those sold under the name of Alrosol, Alrosol B and Alrosol C, i.e. fatty amides.

Fundamentally, all hygroscopic salts may be employed either singly or in mixture in accordance with the invention. However, strongly hygroscopic salts such as the chlorides and nitrates of calcium and magnesium are particularly advantageous with regard to technical as well as economical considerations. Since the effect of the use of a single hygroscopic salt is the same as that where a mixture of such salts is used, the term "hygroscopic salt" as used herein is meant to cover the single salt as well as a mixture of salts.

The hygroscopic salt should be incorporated in the powder layer in the form of as concentrated as possible an aqueous solution. The amount of water necessary therefor may be added to the hygroscopic salt before, during or after its mixture with the powder agent, if necessary in the form of water vapor. This amount of water will be readily ascertained in practice so that an optimumly minimum quantity will be used just capable of dissolving the hygroscopic salt. Generally, the solution should range between a concentration of from about 40–50% of salt by weight.

Such highly concentrated aqueous solution of the hygroscopic salt, formed prior to, during or subsequently to the application of the particular salt on the fertilizer grains, is rapidly and completely absorbed by the powder agent, particularly when the powder agent possesses absorptive properties or contains absorptive materials therein. Nevertheless, the hygroscopic salt solution is absorbed even more quickly by the inert powder material if the surface tension of the solution is somewhat reduced by the addition of a small amount of a non-ionic-surface-active compound as mentioned above.

It is to be noted that the amount of the hygroscopic salt solution supplied to the powder agent or produced in the powder-agent-salt-mixture must always be less than the amount which corresponds to the maximal absorptivity of the power agent used in the dry state. In this way, the water present will be efficiently taken up by the powder agent, preventing any possible contact of the water with the fertilizer grains to cause sticking thereof upon storage.

In comparison to the powdering of a fertilizer with a powder agent without the addition of the hygroscopic salts according to the process of the invention, approximately 3 to 5 fold quantities of the same powder agent may be incorporated as the adhering layer on the surface of fertilizer in accordance with the invention. In this way, a stronger and denser powder layer is obtained which permits an outstanding separation of the individual fertilizer grains from one another and a substantially complete inhibition of the sticking together of the fertilizer grains which heretofore generally occurred with prior powdering techniques.

The most favorable results in the production of a solidly and densely adhering powder layer on the surface of granulated or crystallized fertilizers in accordance with the invention are achieved where the fertilizer is treated with a powder agent in an amount of from 0.3–5% by weight based on the fertilizer weight, and where the hygroscopic salt or salt mixture is added in an amount of from 0.2–0.7% by weight based on the fertilizer weight, the amount of water used being just sufficient for the dissolution of the salt and/or salt mixture. Thus, the water may be present in the salt solution in an amount of from 60 to 50% by weight.

Because of the particular characteristics of the concentrated salt solution absorbed by the powder agent, a moisture content is imparted to the powder layer which is within favorable operative limits, i.e., less than an amount which corresponds to the maximal absorptivity of the powder agent in the dry state, whereby the same essentially improves the adhesive strength of the individual powder agent particles. Such an effect per se could only be obtained temporarily heretofore by the addition of water to a powder agent alone. However, in this connection the known disadvantages inevitably occur, namely that a part of the water absorbed by the powder agent is taken up by the fertilizer grain dusted therewith while the residual part of the water simply evaporates. Thus, simple water addition to the powder agent can only improve the adhesive strength thereof for a short period of time, unless a very strong drying treatment is effected thereafter to form a caked layer or such a small amount of water is used that the quantity of the powder agent which may be effectively utilized increases only very little in comparison to the amount of powder agent utilized in dusting the fertilizer without water addition.

These disadvantages do not occur where a powder agent is employed which is moistened with a hygroscopic salt solution in accordance with the invention instead of with water. In this way, powder layers may be effectively produced which adhere solidly and densely onto the dusted fertilizer even after extended periods of storing without powder separation and without the tendency of the fertilizer grains to stick together. For this reason also the dust accumulation occurring in mechanical manipulation of the grains in transporting the same or spreading the same on the ground is surprisingly small. The adhesive strength of the powder agents may still be somewhat increased, if gelatinous carrier materials, such as, for example, gelatinous magnesium hydroxide are added to the hygroscopic salt solution. These gelatinous carrier materials may also be produced in the instant salt solution, as, for example, by forming magnesium hydroxide in situ therein through the conversion of a part of the magnesium chloride used as the hygroscopic salt with a corresponding amount of calcium hydroxide present therein.

The hygroscopic salt solution incorporated in the powder agent on the surface of the granular fertilizer in accordance with the invention may store comparatively large amounts of water. In consequence of the low water vapor pressure present over such solutions, only small amounts of this water escape to the surrounding environment while in consequence of the localization of such water in the powder layer produced only small amounts of this water pass to the powder enveloped fertilizer grain. A particular advantage resulting from the process of the invention is that the powder layer contains and retains the hygroscopic salt solution in hydrated form, as may be evidenced by the fact that even with prolonged storing in an environment of high relative air moisture the water content of the fertilizer grains so enveloped with the powder layer increases so little that the grains are in no way damaged or changed. Thus, the hygroscopic salt solution added to the powder agent not only increases the adhesive strength of the powder agent but also regulates efficiently and favorably the moisture content of the so powdered fertilizer grain since the salt may take on additional moisture within wide limits without adversely affecting the dry fertilizer grain. Thus, the salt solution acts as a moisture barrier between the atmosphere and the fertilizer grain.

Chemical reactions between the surface of the powdered fertilizer grain and the hygroscopic salt solution absorbed by the powder agent occur only after prolonged storing and only in such small measure that neither the adhesive strength of the powder layer nor the surface of the individual fertilizer grains are essentially changed.

The normal dissolution and decomposition processes of the fertilizer grain which take place in the soil are in no manner disturbed or adversely influenced by reason of the powder layer produced in accordance with the invention.

Therefore, in accordance with the invention, by the addition of a hygroscopic salt solution to the powder agent used there is produced on the surface of the granular fertilizer an adhesive powder layer which prevents the sticking together of the individual fertilizer grains even after prolonged storing and protects such grains as well against the adverse influence of the most varied conditions of air moisture without disadvantageously affecting the normal dissolution processes of the fertilizer in the soil.

In the application of the hygroscopic salt into the powder agent on the surface of the granular fertilizer, it will be apparent that various ordinal procedures may be used. Accordingly, the powder agent and hygroscopic salt may be premixed and incorporated on the granular fertilizer by dusting and thereafter the so dusted fertilizer treated with water vapor. Also, the powder agent may be applied by dusting onto the granular fertilizer, and thereafter the dusted fertilizer may be treated with a concentrated solution of the hygroscopic salt. Moreover, the powder agent may be premixed with a concentrated solution of the hygroscopic salt and the resulting mixture incorporated on the surface of the granular fertilizer. Additionally, the granular fertilizer may be treated with the powder agent and simultaneously sprayed with a concentrated solution of the hygroscopic salt.

The particular technique employed, however, is not critical as, in each case, the hygroscopic salt is incorporated into the powder agent on the surface of the granular fertilizer in the presence of water just sufficient to form a concentrated solution of the hygroscopic salt, i.e., just sufficient to cause dissolution of the salt therein.

Of course, any fertilizer material may be coated with the powder agent-hygroscopic salt layer in accordance with the invention, such as, for example, a nitrogen-phosphorous-potassium complex fertilizer in granular or crystalline form.

Example 1

1.25 kg. kieselguhr were well mixed with 1 kg. of a 40% solution of calcium chloride in water and subsequently 100 kg. of an NPK fertilizer were powdered with this mixture. The powder layer produced was uniform and solidly adhesive. A sticking together of the individual fertilizer grains did not occur, even after a prolonged period of 2 months storing. The dust accumulation present during the scattering of the fertilizer was also surprisingly small even after this prolonged period of storing.

Example 2

100 kg. NPK-fertilizer were mixed with 1.25 kg. kieselguhr and subsequently this mixture sprayed with 1 kg. of a 40% solution of calcium nitrate in water. The results achieved were the same as in Example 1.

Example 3

100 kg. NPK-fertilizer were mixed with 1.25 kg. kieselguhr and simultaneously sprayed with 1 kg. of a 40% aqueous magnesium chloride solution. The powder layer produced showed the same characteristics as in the foregoing examples after 2 months storing.

Example 4

100 kg. NPK-fertilizer were treated with 1.65 kg. of a mixture of 1.25 kg. kieselguhr and 0.4 kg. solid calcium nitrate in an Eirich-mixer. To the mixture thus produced about 0.6 kg. water in the form of water vapor were then supplied. A powder layer resulted which was also solidly adhesive after a prolonged period of storing of about 2 months.

Example 5

The procedure of Example 3 was repeated, except that the 1 kg. of 40% aqueous magnesium chloride solution was omitted. The powder layer produced had only a weight of 0.31 kg./100 kg. NPK fertilizer. Upon storing for a period of 2 months, this fertilizer exhibited some sticking together of the individual grains.

Example 6

1.25 kg. kieselguhr were well mixed with 0.85 kg. of a 48% solution of magnesium chloride in water, additionally containing 0.11 kg. calcium hydroxide. Subsequently, 100 kg. of an NPK fertilizer were powdered with this mixture in accordance with the procedure of Example 1. The results achieved upon 2 months' storing of the material were similar to those of Example 1.

Example 7

The procedure of Example 1 was repeated, additionally containing in said 40% solution 2 grams of a non-ionic surface-active agent consisting of a polyhydric alcohol ester of a high-molecular weight mineral organic acid, prdouced by Advance Solvents & Chemical Corporation under the name Advawet NA-6. The results achieved were similar to those obtained in Example 1.

What is claimed is:

1. Process for the production of densely and strongly adhering layers of powder agents on the surface of granular fertilizers, which comprises incorporating a hygroscopic salt selected from the group consisting of nitrates and chlorides of calcium and magnesium, and mixtures thereof into a powder agent composed of inert moisture absorptive material, selected from the group consisting of kieselguhr, fuller's earth, flue dust, quick ash, ground slate, and mixtures thereof on the surface of a hygroscopic granular nitrogen-phosphorous-potassium fertilizer material in the presence of water, said water being used in an amount sufficient to form a concentrated hygroscopic salt solution in which said salt is present in an amount of from 40 to 50% by weight.

2. Process according to claim 1, wherein said hygroscopic salt in concentrated water solution is premixed with said powder agent and thereafter applied on the surface of said fertilizer material.

3. Process according to claim 1, wherein said powder agent and said hygroscopic salt are premixed, thereafter applied on the surface of said fertilizer material and subsequently subjected to water treatment to form a concentrated solution of said salt in situ.

4. Process according to claim 1, wherein said powder agent is applied on the surface of said fertilizer material and thereafter said hygroscopic salt in concentrated solution is incorporated into said powder agent.

5. Process according to claim 1, wherein said powder agent and said hygroscopic salt are applied on the surface of said fertilizer material with the simultaneous application of water thereto.

6. Process according to claim 1, wherein said water is in the form of water vapor.

7. Process according to claim 1, wherein a non-ionic surface-active agent selected from the group consisting of a polyhydric alcohol ester of a high molecular weight mineral organic acid, and a fatty amide is additionally incorporated with said hygroscopic salt.

8. Process according to claim 1, wherein said powder agent is present in an amount within the range of from 0.3 to 5% and said hygroscopic salt in an amount within the range of from 0.2 to 0.7%, based on the weight of the fertilizer material.

9. Process according to claim 12, wherein said water is present in an amount just sufficient to dissolve said hygroscopic salt and the amount of hygroscopic salt solution formed is less than the amount which corresponds to the maximum absorptivity of the amount of powder agent in the dry state.

10. Process according to claim 1, wherein a small amount of gelatinous magnesium hydroxide as carrier material is additionally incorporated into the layer formed.

11. Process according to claim 14, wherein said magnesium hydroxide is formed by the addition of a quantity of calcium hydroxide sufficient to convert a part of the magnesium chloride solution used as the concentrated hygroscopic salt solution into magnesium hydroxide.

12. A hygroscopic granular nitrogen-phosphorus-potassium fertilizer material having a densely adhering layer of a powder agent of inert moisture absorptive material selected from the group consisting of kieselguhr, fuller's earth, flue dust, quick ash, ground slate, and mixtures thereof containing a hygroscopic salt selected from the group consisting of nitrates and chlorides of calcium and magnesium, and mixtures thereof in concentrated solution form in situ therein on the surface of said granular fertilizer material said salt being present in said solution in an amount of from 40–50% by weight.

13. A granular fertilizer material according to claim 12, wherein said powder agent is present in an amount within the range of from 0.3 to 5% and said hygroscopic salt in an amount of from 0.2 to 0.7%, based on the weight of the fertilizer material.

14. A granular fertilizer material according to claim 12, wherein a non-ionic surface-active agent selected from the group consisting of a polyhydric alcohol ester of a high molecular weight mineral organic acid, and a fatty amide is additionally present in said layer.

15. A granular fertilizer material according to claim 12, wherein a small amount of gelatinous magnesium hydroxide as carrier material is additionally present in said layer.

References Cited in the file of this patent
UNITED STATES PATENTS

| | | |
|---|---|---|
| 2,016,892 | Clarvoe | Oct. 8, 1935 |
| 2,399,987 | Cordie et al. | May 7, 1946 |
| 2,702,747 | Studebaker | Feb. 22, 1955 |
| 2,806,773 | Pole | Sept. 17, 1957 |
| 2,943,928 | Guth | July 5, 1960 |

UNITED STATES PATENT OFFICE
CERTIFICATE OF CORRECTION

Patent No. 3,113,015 December 3, 1963

Fritz W. Brandt et al.

It is hereby certified that error appears in the above numbered patent requiring correction and that the said Letters Patent should read as corrected below.

Column 1, line 43, after "such" strike out the comma; column 6, line 60, for the claim reference numeral "12" read -- 8 --; line 69, for the claim reference numeral "14" read -- 10 --.

Signed and sealed this 12th day of May 1964.

(SEAL)
Attest:
ERNEST W. SWIDER

Attesting Officer

EDWARD J. BRENNER
Commissioner of Patents